United States Patent Office 2,762,740

Patented Sept. 11, 1956

2,762,740

NEW ACYLATED HYDRAZONES AND THEIR USE IN THE CONTROL OF FUNGI

Alfred Margot and Hans Gysin, Basel, Switzerland, assignors to J. R. Geigy A.-G., Basel, Switzerland, a Swiss firm No Drawing. Application May 24, 1955, Serial No. 510,826

Claims priority, application Switzerland May 26, 1954

4 Claims. (Cl. 167—30)

The present invention is concerned with new acylated hydrazones, the production thereof as well as their use in the control of fungi. Trichloromethane sulphenyl-sulphonyl hydrazones have not been known up to now. The surprising observation has now been made that such compounds of the general formula:

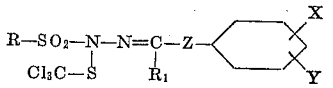

I wherein:

R represents a lower alkyl or halogen alkyl radical,
$R_1$ represents hydrogen or a lower alkyl radical,
X represents hydrogen, a halogen atom, a methyl group or a nitro group,
Y represents hydrogen or a halogen atom, and
Z represents the direct linkage or the vinylene group, —CH=CH—, have an excellent fungicidal action. Because of their low toxicity to warm blooded animals and the absence of phytotoxicity when used in the concentrations which are applied in plant protection, they are suitable as active ingredients for fungicidal agents of the most different froms of application and, in particular, they are suitable for plant protection.

The new compounds can be produced in a simple manner by reacting trichloromethane sulphenyl chloride (perchloromethyl mercaptan) with a sulphonyl hydrazone of the general formula:

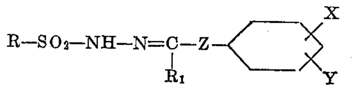

II in the presence of an acid binding agent or with an alkali salt of such a sulphenyl hydrazone. In the above formula, R, $R_1$, X, Y and Z have the meanings given above. To perform the reaction, for example, the sulphonyl hydrazone can be dissolved in diluted alkali lye and the trichloromethane sulphenyl chloride can be added dropwise or poured in at about 10–20°. Generally, the use of previously formed alkali salts dispersed in inert organic solvents as well as the reaction of the free sulphonyl hydrazones in acid binding organic solvents such as, e. g. pyridine, or in inert organic solvents in the presence of acid binding agents such as, e. g. sodium or potassium carbonate, triethylamine or tributylamine, has no advantages over the first mentioned process.

For example, N′-methane sulphonyl-, N′-ethane sulphonyl-, N′-propane sulphonyl-, N′-chloromethane sulphonyl- and N′-α-chlorethane sulphonyl-hydrazones of benzaldehyde, 4-chlorobenzaldehyde, 3.4-dichlorobenzaldehyde, 3-nitrobenzaldehyde, 4-nitrobenzaldehyde, 4-methylbenzaldehyde, cinnamaldehyde, 4-chloro-cinnamaldehyde, acetophenone, 4-chloro-acetophenone, butyrophenone, 3.4-dichlorobutyrophenone, benzalacetone and 4-chloro-benzalacetone can be used as starting materials of the general formula II. These can be produced by reacting suitable sulphonic acid hydrazides with corresponding aldehydes or ketones.

The new trichloromethane sulphenyl-sulphonyl hydrazones are generaly solid crystalline substances, sometimes they are of a honey-like consistency. The following examples further illustrate the production of the new compounds. Parts are given as parts by weight and the temperatures are in degrees Centigrade. The relationship of parts by weight to parts by volume is as that of grammes to cubic centimetres.

*Example 1*

19.8 parts of benzylidene-methane sulphonyl hydrazine (=benzaldehyde methane sulphonyl hydrazone which is easily obtained by reacting methane sulphonyl hydrazine with benzaldehyde, M. P. 155–156°), are dissolved in 200 parts by volume of 0.5 N-caustic soda lye and, while stirring and cooling at about 10°, 19 parts of perchloromethyl mercaptan are added. The whole is stirred for some hours at room temperature, the reaction of the mixture is made phenolphthalein alkaline with caustic soda lye and the precipitate is drawn off under suction. It is washed with water and a little methanol. The N′-methane sulphonyl-N′-trichloromethane sulphenyl-N-benzylidene hydrazine obtained when recrystallised from methanol, melts at 123–124°.

*Example 2*

23.3 parts of benzylidene-chloromethane sulphonyl hydrazine are dissolved in 100 parts by volume of N-caustic soda lye and 19 parts of perchloromethylmercaptan are added dropwise to this solution at 10–15° while stirring well. After stirring for some hours at room temperature, if necessary the reaction is made weakly phenolphthalein alkaline by the addition of caustic soda lye. The pulverulent precipitate consisting of N′-chloromethane sulphonyl-N′-trichloromethane sulphenyl-N-benzylidene hydrazine is then filtered off under suction and washed with water. Recrystallised from cyclohexane, the colourless product melts at 73–74°.

The following compounds can be produced in an analogous manner:

N′-methane sulphonyl-N′-trichloromethane sulphenyl-N-(4-chloro-benzylidene)-hydrazine, M. P. 115–116°;
N′-methane sulphonyl-N′-trichloromethane sulphenyl-N-(4-nitro-benzylidene)-hydrazine, M. P. 166–167°;
N′-methane sulphonyl-N′-trichloromethane sulphenyl-N-(4-methyl-benzylidene)-hydrazine, M. P. 107–108°;
N′-methane sulphonyl-N′-trichloromethane sulphenyl-N-(α-methyl-benzylidene)-hydrazine, M. P. 137–138°;
N′-methane sulphonyl-N′-trichloromethane sulphenyl-N-(2-chloro-5-nitro-benzylidene)-hydrazine, M. P. 158–159°;
N′-methane sulphonyl-N′-trichloromethane sulphenyl-N-cinnamylidene-hydrazine, M. P. 148–149°;
N′-ethane sulphonyl-N′-trichloromethane sulphenyl-N-benzylidene-hydrazine, M. P. 95–96°;
N′-(α-chlorethane sulphonyl)-N′-trichloromethane sulphenyl-N-benzylidene-hydrazine, M. P. 118–119°;
N′-(α-chlorethane sulphonyl)-N′-trichloromethane sulphenyl-N-(4-nitro-benzylidene)-hydrazine; M. P. 139–140°, and after resolidification, M. P. 166–167°;
N′-methane sulphonyl-N′-trichloromethane sulphenyl-N-(α-methyl-3.4-dichloro-benzylidene)-hydrazine;
N′-methane sulphonyl-N′-trichloromethane sulphenyl-N-(α-n-propyl-3.4-dichloro-benzylidene)-hydrazine;
N′-methane sulphonyl-N′-trichloromethane sulphenyl-N-(α-methyl-4-chlor-cinnamylidene)-hydrazine.

In the majority of repeated trials, the residue of a solution, equally distributed on slides of a surface area of about 19 sq. cm. of 25 γ of N′-methane sulphonyl-N′- trichloromethane sulphenyl - N - benzylidene-hydrazine and of N'-chloromethane sulphonyl-N'-trichloromethane sulphenyl-N-benzylidene-hydrazine in 0.25 ccm. of acetone were sufficient to inhibit, in a damp atmosphere, the germination of at least 9/10 of the spores placed thereon of the following fungi: *Alternaria rosae, Alternaria tenuis, Botrytis cinerea, Coniothyrium diplodiella, Fusarium culmorum* and *Pencillium crustaceum,* whilst in individual cases, the ten-fold concentration, i. e. 250 $\gamma$ substance in 0.25 ccm. of acetone was necessary to attain the same effect.

The new acylated hydrazones can be used as such or in combination with suitable carriers and distributers as well as, if desired, with other substances having a fungicidal or insecticidal action for the protection of plants and parts thereof against attack by injurious fungi. They are also suitable, however, for the treatment of organic materials such as, e. g. wood, textiles, furs and leather.

For example, the active ingredients can be combined with solid pulverulent carriers such as, e. g. talc, kaolin, bole, bentonite, chalk, ground limestone, and if desired, the dusting agents obtained can be made suspendable in water by the addition of wetting and dispersing agents. Also the active ingredients can be dispersed in water with the aid of suitable emulsifiers or they can be dissolved in organic solvents, e. g. chlorinated hydrocarbons such as trichloromethylene, or in medium petroleum fractions, if necessary with the addition of auxiliary solvents such as acetone or higher ketones. The active ingredients can also be used when distributed in the air in the form of aerosols, smoke or mist, in particular, e. g. in store rooms and greenhouses.

*Example 3*

2–5 parts of active ingredient, e. g. N'-methane sulphonyl-N'-trichloromethane sulphenyl-N-benzylidene hydrazine are ground with 98–95 parts of talc. The dusting agent so obtained can be used for example, for the disinfection of bedding earth, as well as for the dusting of plants or parts thereof such as bulbs and tubers.

If the content of active ingredient is increased to 15 parts and some adhesive substance is added, then very strongly fungicidal seed dressings are obtained which at the same time are non-toxic and do not influence seed germination.

*Example 4*

By grinding together 10 parts of active ingredient, e. g. N'-methane sulphonyl-N'-trichloromethane sulphenyl-N-($\alpha$-methyl-benzylidene)-hydrazine with 82 parts of kaolin or chalk and mixing with 8 parts of wetting and dispersing agents, e. g. 5 parts of sulphite waste liquor and 3 parts of ethylene oxide condensation products of alkyl phenols, a concentrate is obtained which on mixing with water produces a fungicidal spraying agent which is excellently suitable for the treatment of parts of plants above the ground.

*Example 5*

20 parts of active ingredient, e. g. N'-chloromethane sulphonyl-N'-trichloromethane sulphenyl-N-benzylidene-hydrazine, 50 parts of xylene and 30 parts of ethylene oxide condensation products of alkyl phenols are mixed together to form a concentrate which can be used for the preparation of emulsions in plant protection.

A concentrate for the production of less strongly wetting emulsions is obtained by mixing 25 parts of active ingredient, 67 parts of xylene and 8 parts of ethylene oxide condensation products.

What we claim is:

1. A new acylated hydrazone corresponding to the formula:

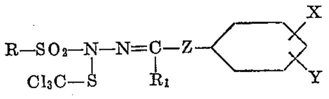

wherein:

R represents a member selected from the group consisting of lower alkyl and lower halogen alkyl radicals,
$R_1$ represents a member selected from the group consisting of hydrogen and lower alkyl radicals,
X represents a member selected from the group consisting of hydrogen, a halogen atom, a methyl group and a nitro group,
Y represents a member selected from the group consisting of hydrogen and a halogen atom, and
Z represents a member selected from the group consisting of the direct linkage and the vinylene group

—CH=CH—

2. N'-methane sulphonyl-N'-trichloromethane sulphenyl-N-benzylidene-hydrazine.

3. N'-chloromethane sulphonyl-N'-trichloromethane sulphenyl-N-benzylidene-hydrazine.

4. A fungicidal composition comprising as essential active ingredient an acylated hydrazone corresponding to the formula:

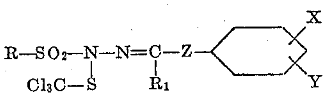

wherein:

R represents a member selected from the group consisting of lower alkyl and lower halogen alkyl radicals,
$R_1$ represents a member selected from the group consisting of hydrogen and lower alkyl radicals,
X represents a member selected from the group consisting of hydrogen, a halogen atom, a methyl group and a nitro group,
Y represents a member selected from the group consisting of hydrogen and a halogen atom, and
Z represents a member selected from the group consisting of the direct linkage and the vinylene group

—CH=CH— and a carrier therefor.

No references cited.